US006985876B1

(12) United States Patent
Lee

(10) Patent No.: US 6,985,876 B1
(45) Date of Patent: Jan. 10, 2006

(54) SYSTEM AND METHOD FOR ENABLING A USER OF AN E-COMMERCE SYSTEM TO VISUALLY VIEW AND/OR CONFIGURE A PRODUCT FOR PURCHASE

(75) Inventor: Reid Lee, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/498,698

(22) Filed: Feb. 7, 2000

(51) Int. Cl.
*G06F 17/60* (2006.01)

(52) U.S. Cl. ........................................... 705/27; 705/26

(58) Field of Classification Search .................. 705/26, 705/27; 345/763, 765, 771, 593, 594, 661, 345/676; 717/105, 109, 113
See application file for complete search history.

(56) References Cited

U.S. PATENT DOCUMENTS

| | | | | |
|---|---|---|---|---|
| 5,301,336 | A * | 4/1994 | Kodosky et al. | 395/800 |
| 5,386,360 | A * | 1/1995 | Wilson et al. | 364/146 |
| 5,481,741 | A | 1/1996 | McKaskle et al. | |
| 5,673,434 | A * | 10/1997 | Risk | 2/144 |
| 5,710,727 | A * | 1/1998 | Mitchell et al. | 364/579 |
| 5,714,687 | A * | 2/1998 | Dunegan | 73/587 |
| 5,884,079 | A * | 3/1999 | Furusawa | 717/109 |
| 5,970,471 | A * | 10/1999 | Hill | |
| 6,061,057 | A * | 5/2000 | Knowlton et al. | 345/335 |
| 6,083,267 | A * | 7/2000 | Motomiya et al. | |
| 6,167,383 | A * | 12/2000 | Henson | |
| 6,182,897 | B1 * | 2/2001 | Knowles et al. | 235/462.01 |
| 6,206,750 | B1 * | 3/2001 | Barad et al. | 445/268 |
| 6,339,763 | B1 * | 1/2002 | Divine et al. | |
| 6,344,853 | B1 * | 2/2002 | Knight | |
| 2001/0049631 | A1 * | 12/2001 | Watts et al. | 705/26 |
| 2002/0010655 | A1 * | 1/2002 | Kjallstrom | 705/27 |
| 2002/0072979 | A1 * | 6/2002 | Sinha et al. | 705/26 |

FOREIGN PATENT DOCUMENTS

WO 00/57254 * 9/2000

OTHER PUBLICATIONS

No Author, "Test and measurement", IEEE Spectrum, v 30, Jan. 1993, p. 56.*

IBM Technical Disclosure "User Interface Design for Product Installation Ordering with a Software Configuration Product", v37, pp. 243-244, TDB-ACC-NO: NA9406243.*

* cited by examiner

*Primary Examiner*—Jeffrey A. Smith
*Assistant Examiner*—Naeem Haq
(74) *Attorney, Agent, or Firm*—Myertons Hood Kivlin Kowert & Goetzel, P.C.; Jeffrey C. Hood

(57) ABSTRACT

A system and method that enables a user to configure a customizable product for purchase in an E-Commerce system. A user may launch a web browser on a client computer system to access a vendor's web site to purchase a customizable product. The user may customize the product for purchase by selecting one or more customizable components of the product. A user may select one or more customizable components of the product by using a forms/menu interface or a visual graphical user interface. The vendor's web site may receive the one or more user selections for the customized product and may, in response, send data and information to client computer system to visually depict the 'as purchased' customized product for user verification and product checkout.

44 Claims, 7 Drawing Sheets

SYSTEM AND METHOD FOR ENABLING A USER OF AN E-COMMERCE SYSTEM TO VISUALLY VIEW AND/OR CONFIGURE A PRODUCT FOR PURCHASE

FIELD OF THE INVENTION

The present invention generally relates to the field of electronic commerce. More particularly, the present invention relates to a system and method for enabling a user of an e-commerce system to visually view and/or configure a product for purchase.

DESCRIPTION OF THE RELATED ART

Electronic commerce or Internet commerce has become an increasingly popular form of commerce in the United States and throughout the world. In general, electronic commerce or Internet-based commerce, often referred to as e-commerce, provides vendors and service providers the ability to greatly increase their sales channel and distribution network with minimal cost. An electronic commerce site provides a convenient and effective mechanism for potential customers to use, select and purchase products in an easy and simple fashion.

E-commerce based applications are gaining rapid acceptance in various industries ranging from retail to healthcare. Products sold via e-commerce range from consumer goods to heavy industrial equipment. A major benefit of e-commerce technology is the ability to customize a product or a service to solve a problem for a specific user or customer.

Various systems have been developed for purchasing products over the Internet. However, these systems have generally provided a very limited visualization capability to display the specific product being purchased by the prospective purchaser or user. For example, some systems display a bill of materials for the product being purchased. This method may provide specific components included with the product being purchased, but it fails to provide a graphical visualization of the product being purchased. Some other systems may display an image of a general product being ordered, but it may not represent the specific product being purchased by the user. For example, if a purchaser orders a personal computer over the Internet, the web site may display a general photo or an image of the type of personal computer being ordered, but the web site may not be able to visually display the customizable attributes of the specific personal computer being purchased.

Purchasing of a configurable or a complex product, such as a computer system, an automobile, a test system or an automation system, via the Internet, each with numerous customizable attributes, complicates the purchasing decision for the user. A configurable product, often simply referred to as a system, may include many user selectable or configurable components. These components are often assembled and packaged together on a customized basis for a specific purchase order. However, with current e-commerce systems a user may experience difficulty in the selection or configuration of various options or components in the system. The user may further experience difficulty in simply visualizing the various possible options or components in the system and their relative position or orientation with respect to the system as a whole.

It may be desirable to provide a more graphical or visual method for enabling a user to select or configure components in a system to be purchased. It may also be highly desirable to utilize a 'What You See Is What You Get' (WSYIWYG) philosophy for products purchased in electronic commerce. Thus, it would be highly desirable to provide a system and method enabling a user of an e-commerce system to visually or graphically configure a product as well as to visually depict the final configured product, consistent with the user configured product options.

SUMMARY OF THE INVENTION

The problems outlined above are in large part solved by a system and method that enables a user to visually or graphically configure and/or view a customizable product, such as for purchase in an e-commerce system. In one embodiment, the e-commerce system includes an e-commerce server, maintained by an e-commerce vendor. The e-commerce server hosts an e-commerce site or a web site of the e-commerce vendor. The e-commerce system also preferably includes a client system which includes web browser software for accessing the web site of the e-commerce vendor.

A user may launch the web browser on the client system to access the vendor's web site to purchase a customizable product. The e-commerce server for the vendor's web site may present, in one embodiment, a forms based GUI to display customizable component options of a product on a client computer system. In another embodiment the GUI may be in the form of an image or graphics visually depicting the customizable product. Images of the customizable components of the product may be visually depicted on the client display in close proximity to their respective locations on the image of the customizable product displayed.

The user may customize the product for purchase by selecting one or more customizable component options of the product. A user may select one or more customizable component options of the product by using a forms/menu interface or a visual graphical user interface. In one embodiment, the user may select a customizable component for configuration by selecting the visually displayed image of the customizable component, wherein the customizable components may be positioned on the image of the customizable product corresponding to their actual position in the system. After a customizable component has been selected, the customizable component options may then be selected, such as by using a pop-up menu or by the user selecting images of the options.

The vendor's web site may receive the one or more user selections for the customized product and may, in response, send data and information to client computer system using dynamic web page generation technology to visually depict the current or final 'as purchased' customized product. The user may verify the visually depicted customized product for accuracy, completeness, etc. prior to proceeding with payment and final check out.

The present invention provides a number of benefits to e-commerce vendors as well as e-commerce users or customers. First, the system and method may increase the amount of revenue for e-commerce vendors through increased closure and/or volume of purchases. In addition, the system and method may decrease the number of product returns due to incorrectly configured products. The present invention may also provide a number of benefits to the user, including ease of use in the selection, configuration and ordering of products using the Internet.

BRIEF DESCRIPTION OF THE DRAWINGS

A better understanding of the present invention can be obtained when the following detailed description of the preferred embodiment is considered in conjunction with the following drawings, in which.

Figure 1:
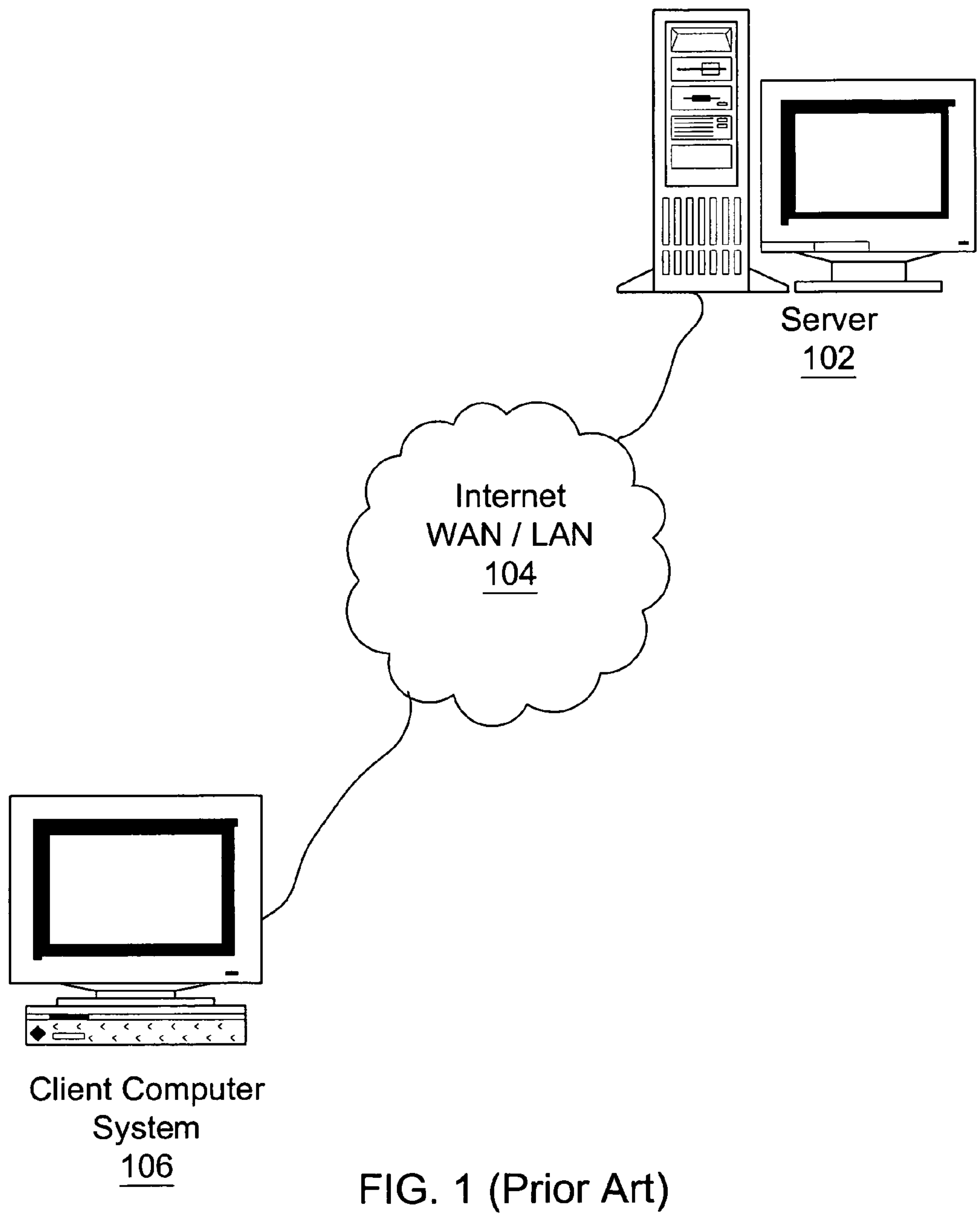
FIG. 1 illustrates an Exemplary Network System for Performing E-Commerce.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1: Network System for Performing E-Commerce

FIG. 1 illustrates a simplified and exemplary electronic commerce (e-commerce) or Internet commerce network system according to one embodiment of the present invention. The embodiment illustrated in FIG. 1 includes one e-commerce server 102 and one client system 106, which may be connected to a network 104 such as the Internet. However, it is noted that the present invention may be utilized with respect to any number of e-commerce servers 102 and client systems 106.

As shown in FIG. 1, a vendor who offers products, for sale over network 104, such as the Internet, preferably maintains the e-commerce server 102. One example of an e-commerce vendor is Amazon.com, which sells books and other items over the Internet. The e-commerce server 102 may offer various products for sale. As used herein, the term "product" is intended to include various types of products, such as books, CDs, content subscription services, furniture, online auction items, clothing, ISP service, consumer electronics, travel, software, medical supplies, automobiles, computer systems, measurement, test and automation systems, etc.

As shown, the e-commerce server 102 may be connected to a network 104, preferably the Internet 104. The Internet 104 is currently the primary mechanism for performing electronic commerce. However, the present invention may be used with any of various types of wide-area networks, or networks of networks, such as the Internet, which connects computers and networks of computers together, thereby providing the connectivity for enabling electronic commerce to operate. Thus, the network 104 may be any of various types of networks, including wired and wireless networks, or combinations thereof.

Client system 106 may also be connected to the Internet 104. The client system 106 may be of various kinds of systems such as a computer system, a network appliance, an Internet appliance, a Personal Digital Assistant (PDA), WEB TV, telephone, two way pager, etc. The client system 106 may execute web browser software for allowing a user of the client system 106 to browse and/or search the Internet 104, as well as enabling the user to conduct transactions or commerce over the Internet 104. The web browser software in client computer system 106 may optionally utilize a 64-bit or 128-bit encryption technology to securely communicate with the e-commerce server 102.

When the user of the client system 106 desires to purchase a product from a vendor over the Internet 104, the web browser software preferably accesses the Web site of the respective e-commerce server, such as e-commerce server 102. The client system 106 may access a web page of the e-commerce server 102 directly or may access the site through a link from a third party. The user of the client computer 106 may also be referred to as a customer, a client or a user.

The everyday shopping process may be applied in an e-commerce environment. The customer accessing an e-commerce vendor's home page may be analogous to a customer entering a store for shopping. The customer may initiate the electronic commerce shopping process by utilizing a virtual shopping cart, passing through various 'sections' within the virtual store and adding one or more products to the virtual shopping cart. The customer may end the shopping process by checking out, i.e., by paying for the contents of the shopping cart, at a virtual check out counter.

Server 102

The e-commerce server 102 may include various standard components such as one or more processors or central processing units, one or more memory media, and other standard components, e.g., a display device, input devices, a power supply, etc. The e-commerce server 102 may also be implemented as two or more different computer systems.

The e-commerce server 102 preferably includes a memory medium on which computer programs according to the present invention are stored. The term "memory medium" is intended to include various types of memory or storage, including an installation medium, e.g., a CD-ROM, or floppy disks, a computer system memory, e.g., RAM, such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the server 102 may take various forms, including a computer system, mainframe computer system, workstation, or other device. In general, the term "computer system" or "server" can be broadly defined to encompass any device having a processor that executes instructions from a memory medium.

The memory medium preferably stores software for an e-commerce system to enable a user to configure and/or view a product according to the methods or flowcharts described below. The software program may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. As another example, the dynamic web page generation may be implemented using technologies such as Common Gateway Interface (CGI), Java Servlets, Active Server Pages (ASP) and other similar technologies. A CPU, such as the host CPU, executing code and data from a memory medium comprises a means for implementing an e-commerce system to enable a user to configure a product according to the methods or flowcharts described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Figure 2A:
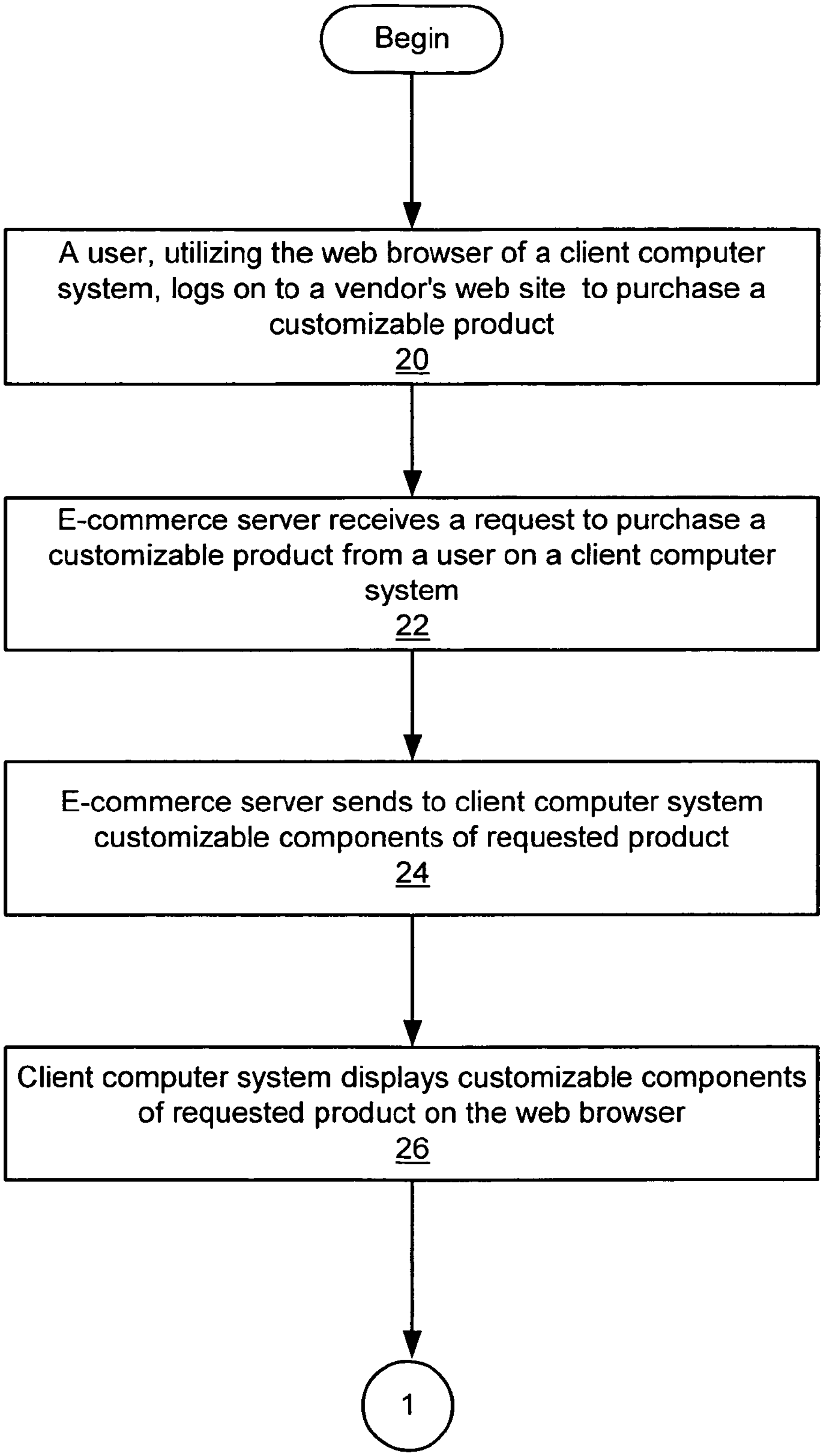
FIGS. 2A and 2B are a flowchart diagram illustrating one embodiment of an E-commerce transaction.
Figure 2B:
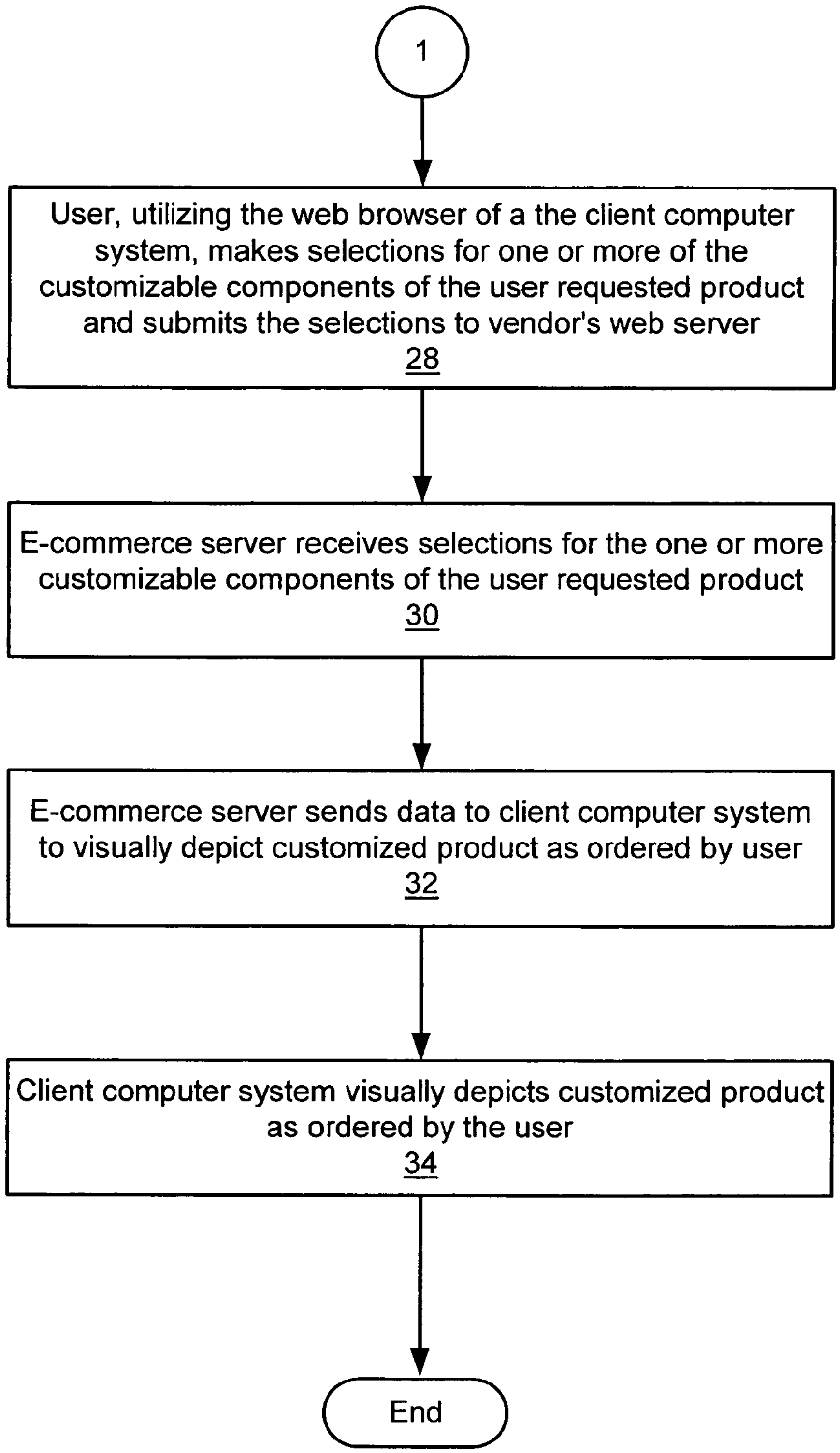

FIGS. 2A and 2B: E-commerce Flowchart

FIGS. 2A and 2B are a flowchart which illustrate one embodiment of an e-commerce method wherein a user of an e-commerce system may visually configure a product, and wherein the product may be visually depicted, consistent with the user configured product options.

In step 20, a user or customer, using the client system 106 executing web browser software, submits a request to the e-commerce server 102 to purchase a customizable product offered by the vendor's web site.

Some products may be purchased 'off-the-shelf', i.e., without further modification. Some other products, referred to herein as configurable products, may require the customer to specify additional options or select certain components of the product, which may require further modification to the 'off-the-shelf' product before being shipped to the customer. Purchasing of a configurable product, such as a computer system, an automobile, a test, measurement, or an automation system, each with numerous user selectable attributes, may complicate the purchasing decision for the user. A configurable product, often simply referred to as a system, may include many user selectable or configurable or specifiable components. These components may often be assembled and packaged together on a customer specific basis for a specific purchase order. The process of specifying or selecting or configuring one or more components of the product may be described as customization of the product.

A product may be described as being customizable if it includes one or more attributes, properties or components that may be selected, configured or specified by the customer. One or more components of a product may be described as being customizable if the one or more components include attributes or properties that may be selected or configured, or where the user may select one of various possible component options. Customizable component options may be included for every customizable component. After a customizable component has been selected for configuration, the customizable component options may then be presented or displayed, wherein the user can select one or several of the customizable component options to specify the customizable component. A customizable component option that is selected by the user becomes a customizable component selection. Customizable component selections applied to a customizable product specify a customized product.

Figure 5:
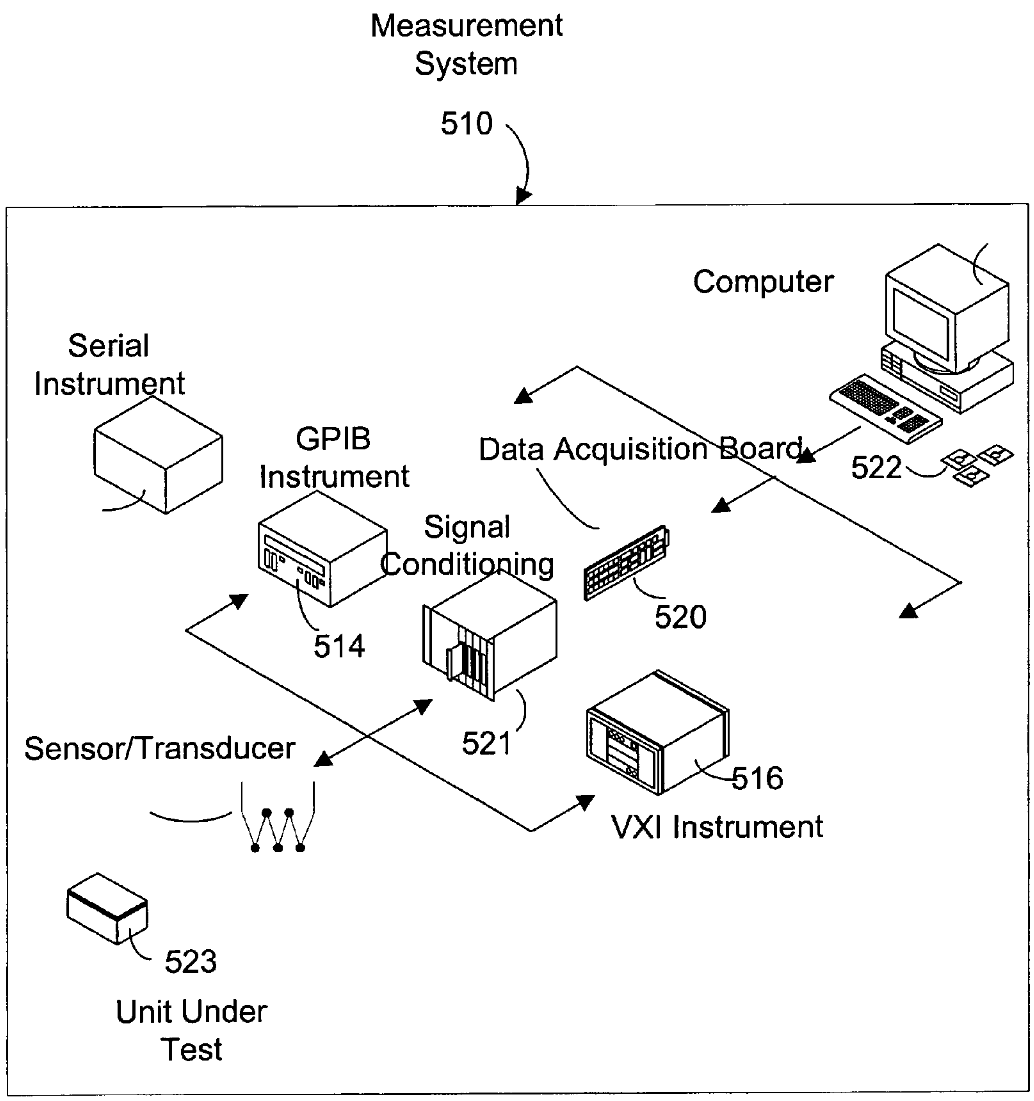
FIG. 5 illustrates a measurement system, an embodiment of a customizable product.
Figure 6:
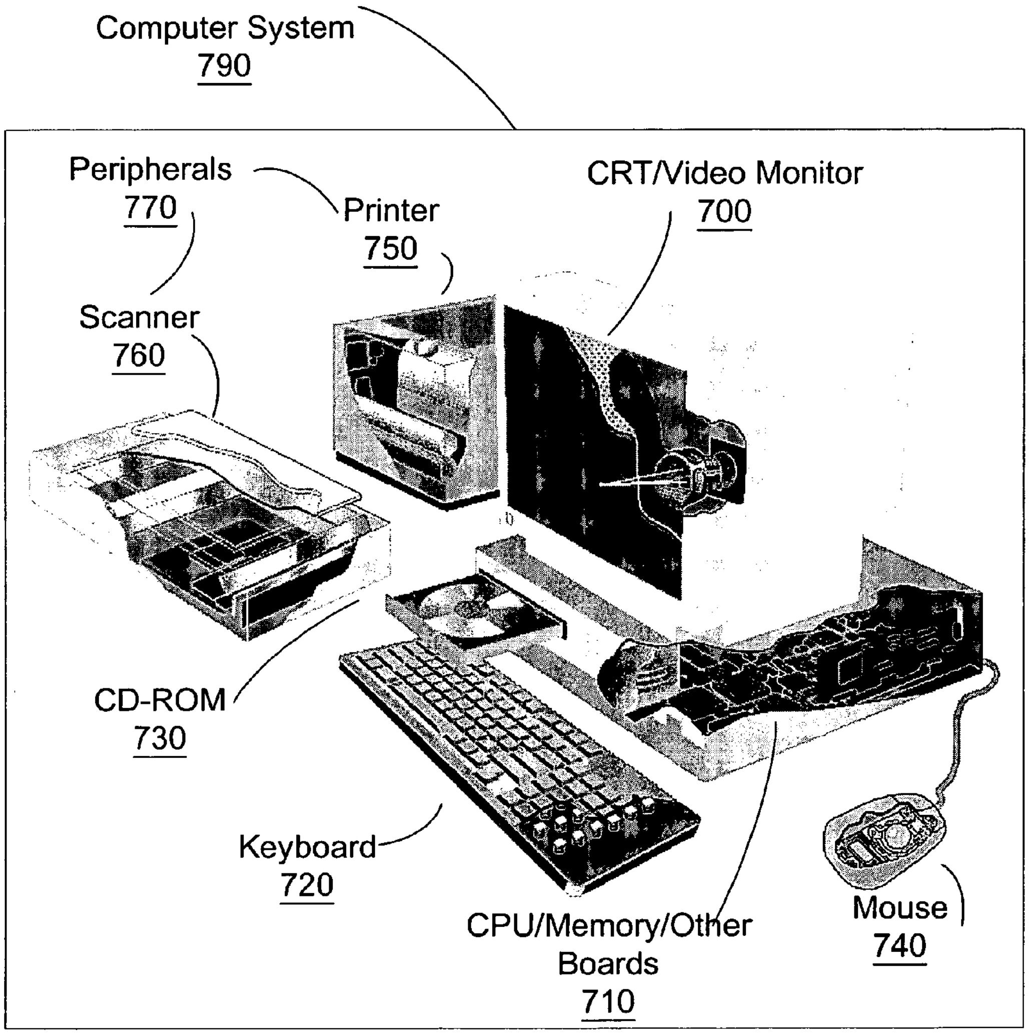
FIG. 6 illustrates a computer system, another embodiment of a customizable product.

FIG. 5 illustrates a measurement system, which is one example of a customizable product. Customizable components of a measurement system may include plug-in data acquisition board 520, software 522, computer 512, signal conditioning boards 521, sensor/transducer 524, etc. When the user specifies selections for one or more customizable components, the measurement system may be described as a customized product, which has been designed to meet the requirements for a specific user. FIG. 6 illustrates a computer system, which is another example of a customizable product. Other examples of customizable products include, but are not limited to, audio systems, video systems, televisions, automobiles, etc.

In step 22, the e-commerce server for the vendor's web site may receive a customer request to purchase a customizable product. The e-commerce server may parse the customer request to generate a response. For example, the customer may be browsing the vendor's web site and select the customizable product for possible purchase.

In step 24, the e-commerce server 102 sends data and information related to the requested customizable product to the client system 106 for display. In step 24 the e-commerce server 102 may send data and information related to the customizable component options of the customizable product.

In step 26, the client system 106 receives the data and information sent by the e-commerce server 102. The client system 106 may then display an image or graphics, such as in the form of a graphical user interface (GUI) in response to the data received from the e-commerce server 102. The graphical user interface (GUI) transmitted by the e-commerce server 102 in step 24 which is used to customize the requested product may take various shapes or forms.

Figure 3:
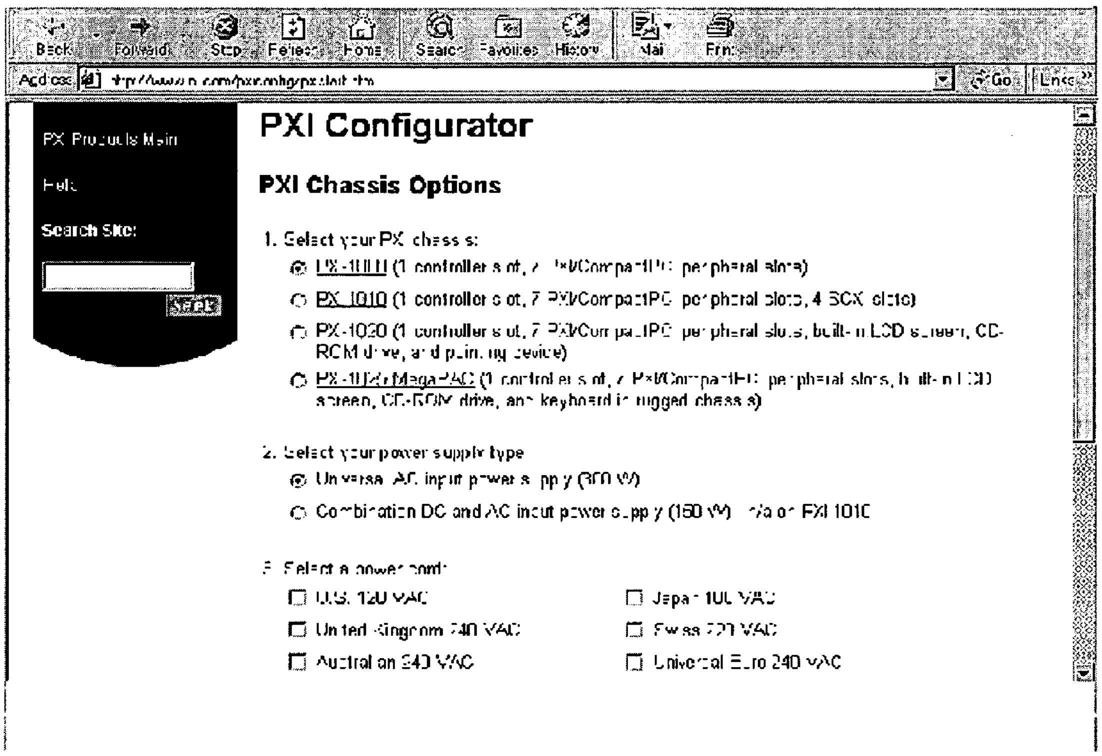
FIG. 3 shows a graphical user interface to select customizable component selections of a product.

In one embodiment, the GUI may be in the form of a menu. Customizable components of the customizable product and customizable component options for the customizable component may be listed. FIG. 3 illustrates an example of a portion of a forms based GUI to select customizable components of a product. The user may be allowed to select customizable component options, e.g., select choices, by clicking in a check box, in one embodiment, or selecting a radio button, in another embodiment. Text corresponding to the customizable components of the customizable product and/or the customizable component options may be displayed in close proximity to each other, in one embodiment.

Figure 4:
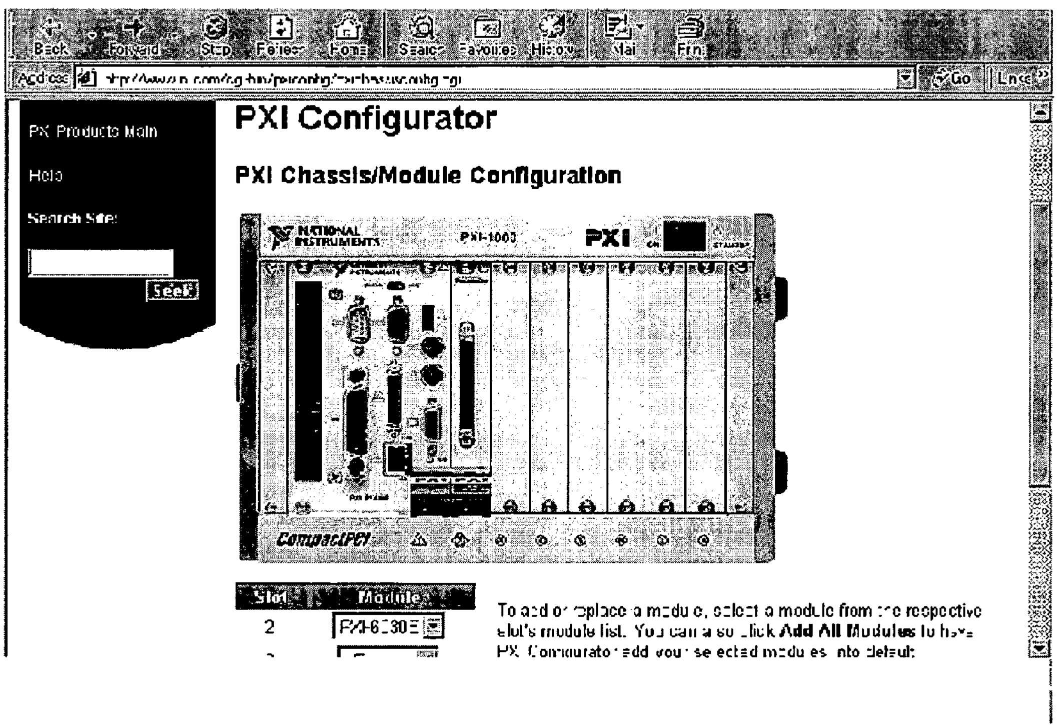
FIG. 4 shows a graphical user interface to visually depict a customized product purchased by the customer.

In another embodiment, the GUI may be in the form of an image or a graphic visually depicting the customizable product. The customizable components of the product may be visually depicted on the image of the customizable product, preferably in close proximity to or "at" the respective location on the product displayed on the client system 106 screen. For example, FIG. 4 illustrates one embodiment of a GUI visually depicting an image of a measurement system which has already been customized. In FIG. 4, each of the slots in the chassis may represent a customizable component. The customizable component options of the customizable components may also be visually depicted. For example, in FIG. 4 the customizable component options may be displayed in menus under the image of the customizable product. Alternatively, the customizable component options may be displayed in close proximity to the respective location of the customizable component on the image of the customizable product displayed on the client system 106.

The customizable components, i.e., the displayed images of the customizable components, may be highlighted or clearly identified in some way to indicate to the user that the respective component is customizable. The user may activate the selection process for a customizable component by clicking on the component or area. In another embodiment, when the user drags a cursor of the client system 106 over the component or area, a pop-up window or menu may appear to enable the user to select or configure the customizable component. The pop-up window, in one embodiment, may include text information displayed in close proximity to the image of the associated customizable component which displays or indicates the customizable component options. In another embodiment, a user may use other drag-and-drop techniques to make customizable component selections.

In step 28, in one embodiment, as the user selects or configures the one or more customizable components, i.e., as the user selects customizable component options for each customizable component, the client system 106 submits the selections for the one or more customizable components to the vendor's e-commerce server 102. In step 30, the vendor's e-commerce server 102 receives the data and information associated with the customer selections.

In one embodiment, on receiving the data and information associated with the customer selections, the e-commerce server 102 may perform further processing to prepare a response or display the current configuration selected. Thus, further processing of the data and information received may include preparing a response to display an image or a drawing to visually depict the current 'as ordered' customized product on a customer screen.

Instead of having every possible combination of user selectable options and their corresponding product images stored in separate graphics files. In one embodiment, each customizable component image of the product may be stored in graphic files. The e-commerce server 106 preferably dynamically integrates the separately stored images into a single image or a drawing to visually depict the current or final 'as ordered' customized product. The dynamic web page generation can be implemented in an e-commerce server by using technologies like Common Gateway Interface (CGI), Java Servlets, Active Server Pages (ASP) and other similar technologies.

In step 32, the vendor's e-commerce server 106 sends the data and information to the client system 106 to enable it to generate a display to visually depict the current or final 'as ordered' customized product. In step 34, the client system 106, in one embodiment, generates a GUI to visually depict the 'as ordered' customized product. The GUI, in another embodiment, utilizes 'What You See Is What You Get' (WSYIWYG) techniques to display a photo or an image or a graphic to visually represent the specific, customized product ordered by the customer. FIG. 4 illustrates one embodiment of a visual depiction of a customized product ordered by the customer. The user may verify the visually depicted customized product for accuracy, completeness, etc. prior to proceeding with payment and final check out.

In one embodiment, the process of selecting one or more customizable components of a customizable product, then subsequently selecting the customizable component options for the selected customizable component, and then displaying the current configuration, may be an interactive process performed in real-time. The user may select a first customizable component of a customizable product, view a plurality of options for the customizable component, and may then make a first customizable component selection among the various options associated with the first customizable component. The client system 106 may receive and display an image substantially like the current configured product, including an image of the first customizable component selection for the first customizable component, for user verification, etc. Thus where the user has selected a module for a certain slot of the PXI chassis of FIG. 4, the e-commerce server 102 may transmit an image displaying the current state of the PXI chassis with the selected module comprised in the chassis. The interactive process may continue until the user has selected the desired number or required number of customizable components and/or customizable component options. Thus steps 28 through 34 may be repeated in an interactive manner in real-time until the user evaluates, confirms and completes the purchase of the customized product.

In another embodiment, the process of selecting customizable components and visually depicting the selections of the customized product may be a batch process, wherein the user may select options for each of the one or more customizable components of a customizable product and may submit a single request to the e-commerce server for all user selections. The client system 106 may generate a GUI to visually depict, e.g., an image substantially like the purchased product, the final customized product for user verification, etc. The user may then verify the accuracy, etc. of the visually depicted customized product. If the displayed customized product is found not to meet user requirements, then steps 28 through 34 may be repeated till the user requirements have been met and the user completes the transaction to purchase the customized product.

FIG. 5: Measurement System—An Example of A Customizable Product

FIG. 5 illustrates an exemplary measurement system 510, which is one embodiment of a customizable product. The system 510 comprises a computer 512, which connects to one or more instruments. The one or more instruments may include a GPIB (general purpose interface bus) instrument 514, a VXI (VME eXtension for Instrumentation) chassis 516 comprising one or more VXI card instruments, a serial instrument 518 and/or a data acquisition board 520. The GPIB instrument 514 may be coupled to the computer 512 via a GPIB interface provided by the computer 512. The VXI instrument 516 may be coupled to the computer 512 via a VXI bus or MXI bus provided by the computer. The serial instrument 518 may be coupled to the computer 512 through a serial port, such as an RS-232 port, provided by the computer 512. Finally, the data acquisition device 520 may be coupled to the computer 512, typically by being plugged in to an I/O slot in the computer such as a PCI bus slot, provided by the computer 512. The data acquisition device 520 may couple through signal conditioning logic. In typical measurement systems an instrument will not be present of each interface type and in fact many systems may only have one or more instruments of a single interface type, such as only GPIB instruments.

The instruments may be for coupling to a unit under test (UUT) 523, a process, or are coupled to receive field signals, typically generated by sensors or transducers 524 which have been designed to measure variables such as temperature, flow, pressure, motion, etc. related to the UUT 523. The measurement system 510 may be used in a data acquisition and control application, or may instead be used in a test and measurement application. If the system 510 is used in a data acquisition application, the system 510 also preferably includes signal conditioning circuitry 521 coupled between the data acquisition board 520 and transducers 524.

As discussed above, the user may configure a customized measurement system by specifying customizable component selections of various customizable components in the customizable measurement system. The customization process may be performed in any desired manner, such as starting with the transducers 524 and ending up with the computer 512. For example, the user may start customization with the selection of the sensor/transducers 524, selection of signal conditioning modules 521, selection of the type of data acquisition device 520 that has the desired sample rate, desired number of channels, desired accuracy, etc., and then selection of the appropriate software for the user's application, e.g., LabVIEW, NI-DAQ driver level software, and possibly selection of the type of computer 512. The customizable components may include, but may not be limited to, one or more types of data acquisition board 520, one or more types of signal condition modules that make up signal conditioning circuitry 521, type of bus interface (GPIB, VXI, MXI, etc.), type of VXI, GPIB or serial instruments, software 522. The term "instrument" used herein also includes software code or software objects, which implement instrument functionality or are used to control instruments.

FIG. 6: Computer System—An Example of A Customizable Product

FIG. 6 illustrates a computer system 790, which is another embodiment of a customizable product. Customizable components of computer system may include CPU type, memory type and/or amount (system memory and non-volatile memory), and selection of add-in cards or boards 710, video monitor or display 700, keyboard 720, CD-ROM 730, pointing device 740, printer 750, scanner 760, and other peripherals 770. Peripherals 770 may include devices such as CRT/video monitor 700, keyboard 720, CD-ROM 730, mouse 740, printer 750, scanner 760, floppy disk (not shown), etc. The customizable components of the computer system may also include the software, e.g., operating system and desired applications. The above are merely examples of customizable components, it being noted that various other components or attributes may be selectable by a user in configuring a computer system.

The various CPU options may include CPU type, e.g., Intel Pentium, Intel Merced, AMD Athlon, PowerPC, as well as the CPU speed, e.g., 500 MHz, 600 MHZ, 700 MHz, etc.

The various memory options may include system memory type, such as standard DRAM, RAMBUS RAM, synchronous DRAM, etc., memory speed, and amount of memory, e.g., 64 Mbytes, 128 Mbytes, 256 Mbytes. The various memory options may also include non-volatile memory options such as size, e.g., 6 Gbytes, 10 Gbytes, 20 Gbytes etc., type, e.g., magnetic or optical storage, and access time, among others.

The various add-in card options may include choice of sound card and speakers, choice of video card, choice of 3D graphics card, choice of modem or other communications device, choice of network card, and choice of instrument or automation cards, among others.

The various display options may include display size, e.g., 15" viewable area, 17" viewable area, and display type, e.g., analog CRT, LCD, flat screen, as well as refresh rate, resolution, etc.

The various peripheral options may include selections among different types of keyboards, such as ergonomic keyboards, type and speed of CD-ROM, type of pointing device, such as mouse, trackball, choice of printer, scanner, and other peripherals.

The various software options may include the operating system, e.g., Windows 98, Windows 2000, Windows NT, Linux, Mac OS, and applications, such as word processing software, web browser software, games, etc.

The user may initiate the customization process by selecting the customizable components of the computer system 790. The customization process may utilize a menu or forms based approach, including use of menus and sub-menus. In another example, as illustrated in FIG. 6, the customization process may utilize a visual approach to customize the customizable components of the product. For example, the vendor may visually depict the computer system on a client system 106 screen, and the user may select images of the customizable components for customization. As noted above, the visual based approach to product customization process may identify, with the use of color, animation, etc., all customizable components of a product. The user may click on an image of a customizable component for further selection and/or specification.

Using a hierarchical approach in the selection process, the environment related selections may specify a country where the computer may be installed, thereby specifying the power voltage/frequency requirements, telephone requirements, audio/video requirements, language preferences, etc. The hardware selections may include all boards for the computer system 790, including motherboard, memory board, I/O boards, etc., storage devices and then branching out to the peripheral devices such as printer 750, etc. The software selections may include the type of operating system, the type of web browser, optional application software, etc.

Numerous variations and modifications will become apparent to those skilled in the art once the above disclosure is fully appreciated. It is intended that the following claims be interpreted to embrace all such variations and modifications.

What is claimed is:

1. A method for enabling a user to configure a measurement system in an E-Commerce system, wherein the e-commerce system includes a client system coupled through a network to an electronic commerce server, the method comprising:

receiving a request from a user of the client system to configure the measurement system, wherein the measurement system includes one or more customizable components, wherein at least one of the customizable components is a measurement device;

providing customizable component options of the customizable components to the client system for display after receiving said request, wherein said providing the customizable component options includes providing an image of the measurement system to the client system for display, wherein images of at least a subset of the one or more customizable components form at least a portion of the image of the measurement system;

receiving customizable component selections for at least one of the one or more customizable components of the measurement system in response to user input, wherein the customizable component selections applied to the measurement system specify a configured measurement system, wherein said receiving customizable component selections includes:

receiving user input selecting an image of a first customizable component displayed in the image of the measurement system, wherein said receiving user input selecting the image of the first customizable component operates to select the first customizable component for configuration; and receiving user input selecting a first customizable component option for the first customizable component, wherein the user input selecting the first customizable component option comprises the customizable component selection for the first customizable component; and providing an image of the configured measurement system to the client system for display, wherein the image of the configured measurement system visually depicts the customizable component selections of the user.

2. The method of claim 1, wherein said providing the image of the configured measurement system includes providing customizable component selection images corresponding to the customizable component selections of the user.

3. The method of claim 2, wherein at least a subset of the customizable component selection images are visually depicted at their respective locations on the image of the configured measurement system.

4. The method of claim 3, wherein at least a subset of the customizable component selection images are displayed in the image of the configured measurement system.

5. The method of claim 1, wherein said providing the image of the configured measurement system includes providing text corresponding to the customizable component selections of the user;

wherein the text is visually depicted proximate to respective locations of the customizable components comprised in the image of the configured measurement system.

6. The method of claim 1, wherein the image of the configured measurement system appears substantially like the configured measurement system.

7. The method of claim 1, wherein the image of the configured measurement system is viewable by the user and used by the user to evaluate and confirm the customizable component selections.

8. The method of claim 7, further comprising:

receiving one or more new customizable component selections for at least one of the one or more customizable components of the configured measurement system after said providing the image of the configured measurement system to the client system, wherein the new customizable component selections applied to the configured measurement system specify a new configured measurement system;

providing an image of the new configured measurement system, wherein the image of the new configured measurement system visually depicts the new customizable component selections of the user.

9. The method of claim 1, wherein said receiving selections includes:

receiving user input selecting a first customizable component;

providing a menu of possible options for the first customizable component to the client system for display after the user input selecting the first customizable component;

receiving user input selecting one of the possible options for the first customizable component.

10. The method of claim 1, wherein said receiving user input selecting the image of the first customizable component further includes:

receiving user input indicating a position of a cursor of the client system overlaps the location of the image of the first customizable component displayed in the image of the measurement system.

11. The method of claim 1, wherein said receiving customizable component selections further includes:

providing a menu comprising the customizable component options of the first customizable component for display on the client system after said receiving user input selecting the image of the first customizable component.

12. The method of claim 11, wherein the menu comprising the customizable component options includes text indicating the customizable component options.

13. The method of claim 11, wherein the menu comprising the customizable component options includes images indicating the customizable component options.

14. The method of claim 11, wherein the menu is operable to be displayed proximate to the location of the image of the first customizable component.

15. The method of claim 1, wherein said receiving customizable component selections further includes:

providing a sequence of images corresponding to the customizable component options of the first customizable component after said receiving user input selecting the image of the first customizable component.

16. The method of claim 1, wherein said receiving user input selecting the first customizable component option includes:

providing customizable component option images corresponding to the customizable component options of the first customizable component;

receiving user input selecting a first customizable component option image corresponding to the first customizable component option.

17. The method of claim 1, wherein said providing customizable component options of the customizable components to the client system includes providing images of the customizable component options to the client system.

18. The method of claim 1, further comprising:

providing an image of the first customizable component option for display on the client system in response to said receiving user input selecting the first customizable component option for the first customizable component.

19. The method of claim 1, further comprising:

the client system displaying the image of the configured measurement system in response to said providing the customizable component options of the customizable components to the client system, wherein images of at least a subset of the one or more customizable components are displayed in the image of the configured measurement system;

wherein, for each customizable component, the customizable component options are displayed proximate to the image of the customizable component.

20. The method of claim 1, further comprising:

the client system displaying customizable component options of the customizable components in response to said providing the customizable component options of the customizable components to the client system; and the client system displaying the image of the configured measurement system in response to said providing the image of the configured measurement system to the client system for display, wherein the displayed image of the configured measurement system visually depicts the customizable component selections of the user.

21. The method of claim 20, wherein the customizable component selections include one or more of: measurement card; cable, signal conditioning modules and transducer.

22. A method for enabling a user to configure a computer system in an e-commerce system, wherein the e-commerce system includes a client system coupled through a network to an electronic commerce server, the method comprising:

receiving a request from a user of the client system to purchase the computer system, wherein the computer system includes one or more customizable components;

providing customizable component options of the customizable components to the client system for display after receiving said request, wherein said providing customizable component options of the computer system includes providing an image of the computer system to the client system for display, wherein images of at least a subset of the one or more customizable components form at least a portion of the image of the computer system;

receiving customizable component selections for at least one of the one or more customizable components of the computer system in response to user input, wherein the customizable component selections applied to the computer system specify a configured computer system, wherein said receiving customizable component selections includes:

receiving user input selecting an image of a first customizable component which is displayed in the image of the computer system, wherein said receiving user input selecting the image of the first customizable component operates to select the first customizable component for configuration; and receiving user input selecting a first customizable component option for the first customizable component, wherein the user input selecting the first customizable component option comprises the customizable component selection for the first customizable component; and providing an image of the configured computer system to the client system for display, wherein the image of the configured computer system visually depicts the customizable component selections of the user.

23. The method of claim 22, wherein said providing the image of the configured computer system includes providing customizable component selection images corresponding to the customizable component selections of the user.

24. The method of claim 23, wherein at least a subset of the customizable component selection images form at least a portion of the image of the configured computer system.

25. The method of claim 23, wherein at least a subset of the customizable component selection images are displayed in the image of the configured computer system.

26. The method of claim 22, wherein said providing the image of the configured computer system includes providing text corresponding to the customizable component selections of the user;

wherein the text is visually depicted proximate to respective locations of the customizable components comprised in the image of the configured computer system.

27. The method of claim 22, wherein the image of the configured computer system appears substantially like the configured computer system.

28. The method of claim 22, wherein the image of the configured computer system is viewable by the user and used by the user to evaluate and confirm the customizable component selections.

29. The method of claim 28, further comprising:

receiving one or more new customizable component selections for at least one of the one or more customizable components of the configured computer system after said providing the image of the configured computer system to the client system, wherein the new customizable component selections applied to the configured computer system specify a new configured computer system;

providing an image of the new configured computer system, wherein the image of the new configured computer system visually depicts the new customizable component selections of the user.

30. The method of claim 22, wherein said receiving selections includes:

receiving user input selecting a first customizable component;

providing a menu of possible options for the first customizable component to the client system for display after the user input selecting the first customizable component;

receiving user input selecting one of the possible options for the first customizable component.

31. The method of claim 22, wherein said providing customizable component options of the customizable components to the client system includes providing images of the customizable component options to the client system.

32. The method of claim 22, wherein said receiving user input selecting the image of the first customizable component further includes:

receiving user input indicating a position of a cursor of the client system overlaps the location of the image of the first customizable component displayed in the image of the computer system.

33. The method of claim 22, wherein said receiving customizable component selections further includes:

providing a menu comprising the customizable component options of the first customizable component for display on the client system after said receiving user input selecting the image of the first customizable component.

34. The method of claim 33, wherein the menu comprising the customizable component options includes text indicating the customizable component options.

35. The method of claim 33, wherein the menu comprising the customizable component options includes images indicating the customizable component options.

36. The method of claim 33, wherein the menu is operable to be displayed proximate to the location of the image of the first customizable component.

37. The method of claim 22, wherein said receiving customizable component selections further includes:

providing a sequence of images corresponding to the customizable component options of the first customizable component after said receiving user input selecting the image of the first customizable component.

38. The method of claim 22, wherein said receiving user input selecting the first customizable component option includes:

providing customizable component option images corresponding to the customizable component options of the first customizable component;

receiving user input selecting a first customizable component option image corresponding to the first customizable component option.

39. The method of claim 22, further comprising:

providing an image of the first customizable component option for display on the client system in response to said receiving user input selecting the first customizable component option for the first customizable component.

40. The method of claim 22, further comprising:

the client system displaying the image of the configured computer system in response to said providing the customizable component options of the customizable components to the client system, wherein images of at least a subset of the one or more customizable components are displayed in the image of the configured computer system;

wherein, for each customizable component, the customizable component options are displayed proximate to the image of the customizable component.

41. The method of claim 22, further comprising:

the client system displaying customizable component options of the customizable components in response to said providing the customizable component options of the customizable components to the client system; and the client system displaying the image of the configured computer system in response to said providing the image of the configured computer system to the client system for display, wherein the displayed image of the configured computer system visually depicts the customizable component selections of the user.

42. The method of claim 41, wherein the customizable component selections include one or more of: display, peripheral devices, storage devices, memory size, communication type, memory type.

43. A memory medium comprising program instructions for enabling a user to configure a measurement system in an e-commerce system, wherein the e-commerce system includes a client system coupled through a network to an electronic commerce server, wherein the program instructions are executable to implement:

receiving a request from a user of the client system to configure the measurement system, wherein the measurement system includes one or more customizable components, wherein at least one of the customizable components is a measurement device;

providing customizable component options of the customizable components to the client system for display after receiving said request, wherein said providing the customizable component options of the measurement system includes providing an image of the measurement system to the client system for display, wherein images of at least a subset of the one or more customizable components form at least a portion of the image of the measurement system;

receiving customizable component selections for at least one of the one or more customizable components of the measurement system in response to user input, wherein the customizable component selections applied to the measurement system specify a configured measurement system, wherein said receiving customizable component selections includes:

receiving user input selecting an image of a first customizable component which is displayed in the image of the measurement system, wherein said receiving user input selecting the image of the first customizable component operates to select the first customizable component for configuration; and receiving user input selecting a first customizable component option for the first customizable component, wherein the user input selecting the first customizable component option comprises the customizable component selection for the first customizable component; and providing an image of the configured measurement system to the client system for display, wherein the image of the configured measurement system visually depicts the customizable component selections of the user.

44. A memory medium comprising program instructions for enabling a user to configure a computer system in an e-commerce system, wherein the e-commerce system includes a client system coupled through a network to an electronic commerce server, wherein the program instructions are executable to implement:

receiving a request from a user of the client system to purchase the computer system, wherein the computer system includes one or more customizable components;

providing customizable component options of the customizable components to the client system for display after receiving said request, wherein said providing customizable component options of the computer system includes providing an image of the computer system to the client system for display, wherein images of at least a subset of the one or more customizable components form at least a portion of the image of the computer system;

receiving customizable component selections for at least one of the one or more customizable components of the computer system in response to user input, wherein the customizable component selections applied to the computer system specify a configured computer system, wherein said receiving customizable component selections includes:

receiving user input selecting an image of a first customizable component which is displayed in the image of the computer system, wherein said receiving user input selecting the image of the first customizable component operates to select the first customizable component for configuration; and receiving user input selecting a first customizable component option for the first customizable component, wherein the user input selecting the first customizable component option comprises the customizable component selection for the first customizable component; and providing an image of the configured computer system to the client system for display, wherein the image of the configured computer system visually depicts the customizable component selections of the user.

* * * * *